United States Patent Office 3,057,924
Patented Oct. 9, 1962

3,057,924
HIGH PRESSURE REACTION OF DIBORANE AND ETHYLENE
David K. Eads, Allison Park, and George P. Brandt, Valencia, Pa., assignors to Callery Chemical Company, Pittsburgh, Pa., a corporation of Pennsylvania
No Drawing. Filed Nov. 14, 1955, Ser. No. 546,817
1 Claim. (Cl. 260—606.5)

The invention relates to the preparation of high energy fuels containing boron and particularly to their preparation from ethylene and diborane by a process involving super atmospheric pressures.

High energy fuels have become exceedingly important in recent years and considerable effort has been expended to develop methods for producing such fuels with exceptionally high heats of combustion. Chemical compositions containing boron have been found to be desirable as fuels because of their high heats of combustion. Other elements such as lithium and beryllium have been investigated but compounds of these elements are relatively rare and difficult to obtain compared to boron which exists in the form of borax (sodium tetraborate) in huge concentrated deposits in California and elsewhere. Many boron derivatives have been prepared and of these diborane ($B_2H_6$) and reaction products of diborane have shown the most promise. Because of the fact that diborane is a gas at normal temperatures and pressures efforts have been concentrated on ways to react diborane with other materials such as ethylene to produce a liquid product which would have the desirable properties of a high energy fuel and yet be stable at room temperature and atmospheric pressure.

In Hurd, J.A.C.S. 70, 2053–2055 (1948); there is described a process in which diborane was reacted with ethylene. In that process, however, a substantial excess of ethylene (50:1) was used and the only product obtained was triethyl borane ($BEt_3$).

It is an object of this invention to provide a new and improved method for preparing high energy fuels from ethylene and diborane.

Another object is to provide a process whereby ethylene and diborane react under high pressure to form a liquid product which is useful as a high energy fuel.

Another object is to provide a two stage process whereby ethylene and diborane react under high pressure to form a liquid product which is useful as a high energy fuel.

A still further object of this invention is to provide a new and improved method of reacting ethylene and diborane whereby the formation of solid undesirable products is inhibited.

Other objects of this invention will become apparent throughout the specification and claims hereinafter related.

This new and improved method will be more fully described in the specification and the novelty thereof will be particularly pointed out and distinctly claimed.

This invention is based upon our discovery that ethylene and diborane will react at super atmospheric pressures to form high energy fuels. For the purpose of explanation and description this process is best considered as a two-step operation. The process is not necessarily carried out physically in two steps, although under certain circumstances separation makes process control more satisfactory. In the first step, ethyl diboranes are produced and in the second step these compounds are co-pyrolyzed with additional diborane to form higher boron hydrides and alkyl derivatives thereof, most of which are soluble in the ethyl diboranes. The higher boron hydrides have substantially better heating values than do the ethyl diboranes, and hence, the product so produced is more desirable as a fuel. By proper control, the two stages of reaction can be carried out either in sequence or simultaneously.

Experimental data show that when ethyl diboranes are present during diboranes pyrolysis the formation of undesirable solid boron hydrides is inhibited. This has been demonstrated by the fact that the system can be operated for longer periods of time without plugging. Other data show that when high pressures (up to 2000 p.s.i.g. and higher) are used the same extent of pyrolysis can be achieved at low temperatures in the range from 25° to 100° C. as can be obtained at one atmosphere and higher temperatures of about 200° C. This is advantageous since higher temperatures tend to cause formation of solid, insoluble, and hence, undesirable higher boron hydrides.

Thus, in general, the formation of desirable liquid products is favored by high pressures, which in turn permit the use of low temperatures and long residence times in the reactor to achieve a reasonable reaction rate.

The first apparatus used for carrying out this process consisted of a single stainless steel reactor tube approximately 1′ long and ¼″ in diameter which was surrounded by a heating element. Ethylene and diborane were metered into this tube at the desired temperature and pressure. After reaction, the products were condensed and analyzed. Preliminary experiments were troublesome in that when the two gases were mixed they reacted immediately and considerable heat was evolved which made it difficult to control the temperature. Furthermore, solids formed at the point where the ethylene and diborane mixed which resulted in plugging of the reactor. These experiments demonstrated that it would be preferred to separate the alkylation and pyrolysis reactions. Consequently, two reactor tubes were connected in series. The gases were mixed in a water cooled section of the first reactor tube. The gases were then passed through a fine mesh wire screen to the reaction zone where the gases were heated by means of a heating coil, to initiate the reaction. Temperatures were measured inside the reaction tubes by means of a thermocouple. Ethyl diboranes were formed in the first reactor tube and were passed with a further amount of diborane into the second reactor tube in which the pyrolysis reaction occurred. Four thermocouples were mounted on the outside wall of the second reactor tube at intervals of 2½″. The entire reactor was jacketed with a copper tube which was closed on both ends to produce a uniform temperature throughout the length of the pyrolysis zone. Heat was applied to the reactor by means of electrical heaters which surrounded the jacket. The off-gas from the second reactor was passed through condensers which removed the condensable products, and the noncondensable remainder, consisting mainly of hydrogen and diborane was passed through a hydrogen analyzer. A constant hydrogen concentration in the off-gas indicated that a steady state condition existed in the system. The hydrogen content of the off-gas also served as a measure of the extent of pyrolysis.

In one experiment using a diborane to ethylene ratio of 2 to 1, a temperature of about 20 to 30° C. and a pressure of 400 p.s.i.g., the mixture reacted explosively confirming the fact that the reaction is extremely fast and must be controlled by using a diluent, higher ratios of diborane to ethylene or other means.

In another experiment using diborane to ethylene ratio of 8 to 1, a temperature of 130° C. and a pressure of 150 p.s.i.g., the hydrogen analyses indicated no hydrogen in the off-gas and hence no pyrolysis of the diborane. The liquid product was fractionated and found to contain ethyl diboranes ($B_2H_{6-x}Et_x$, where $x$ is 1 to 4) which appear to be intermediates in the pyrolysis reaction but with no indication of boron hydrides higher than diborane. Other data indicate that pyrolysis does occur at this pressure but that it is very slow. At higher temperatures or at higher pressures the rate of pyrolysis is much faster.

In another experiment in which the alkylation and pyrolysis reactions were separated favorable pyrolysis conditions were used consisting of a total diborane to ethylene ratio of 3 to 1, a temperature of 140 to 150° C. and a pressure of 400 p.s.i.g. Analysis revealed 32 to 50% hydrogen in the off-gas indicating considerable pyrolysis. Infra-red analysis of certain fractions of the liquid sample collected indicated that it contained tetraborane, pentaborane, decaborane and their alkyl derivatives in addition to the ethyl diboranes. It is thus apparent that higher boron hydrides are formed when the proper conditions are used and inasmuch as their heating values are greater than those of the ethyl diboranes, the resultant product is more desirable. The product obtained was liquid and had a relatively low vapor pressure. The product was not spontaneously inflammable at room temperature and had a heat of combustion in excess of that of the ethyl diboranes. The product had an average analysis of 40–50 milligram atoms per gram of boron and evolved 60 to 85 mmol $H_2$ per gram of sample upon complete hydrolysis.

The advantages of high pressure in a single reactor were determined in another series of experiments which are tabulated below in which H is expressed in millimols of hydrogen evolved upon the complete hydrolysis of one gram of sample while boron and carbon are expressed in milligram atoms per gram of sample.

| Run No. | Diborane Ethylene Ratio | Temp., ° C. | Pressure, p.s.i.g. | Analysis of Liquid Reaction Product | | |
|---|---|---|---|---|---|---|
| | | | | H | B | C |
| 1 | 4:1 | 150 | (¹) | 40.3 | 24.4 | 45.8 |
| 2 | 4:1 | 150 | 150 | 48.7 | 29.4 | 41.5 |
| 3 | 4:1 | 150 | 450 | 94.4 | 52.8 | 23.4 |

¹ Atmospheric.

It is apparent from the above data that, when the same temperature and ratio of reactants is used, increased pressures will significantly raise the boron content of the resulting liquid product. The actual boron content of the product will depend on the relative amounts of the various types of compounds present.

Further experimental work at pressures up to 2000 p.s.i.g. shows that further increase in pressure increases the rate of pyrolysis and increases the proportion of boron in the reaction product. The limitations of the effect of pressure on pyrolysis are as yet unknown. It should be noted that the exact mechanism of pyrolysis under pressure is unknown and also that the increased rate of pyrolysis at high pressures appears to go contrary to Le Chatelier's principle.

The liquid products which are produced by the above reactions are useful as high energy fuels in bipropellant systems. These liquid high energy fuels burn readily with conventional oxidizers, including air and oxygen, and are primarily useful in turbojet, ram jet, and rocket engines. These fuels may be used alone or in mixtures with other fuels toward which they are chemically inert, e.g. most ordinary hydrocarbon fuels. These fuels have a high heat of combustion (greater by 20–50% than the best hydrocarbon fuels), are spontaneously inflammable in air at high temperatures (in excess of 250°–300° F.), and have other desirable fuel properties, e.g. large liquidus range, low viscosity, stability against thermal decomposition and moderately resistant to hydrolysis. In actual tests the fuel produced by the above process is used as follows: A sample of the fuel is introduced into the combustion section of a jet test engine, burned with compressed air, and the efficiency of the combustion and output of the engine measured. When this fuel was burned in a test engine it was found to have a heat of combustion more than 20% greater than the best hydrocarbon fuels. The combustion efficiency of this fuel was equal to JP–4 (a standard jet fuel in use for several years past) and the thrust of the engine per unit weight of fuel was substantially greater than the thrust obtained using the best hydrocarbon fuels. In comparative tests on the fuel produced by the above process and other boron-containing high energy fuels and other hydrocarbon fuels it has been found that engine output is directly proportional to the heat of combustion per unit weight of fuel. Thus, an aircraft using a high energy boron-containing fuel can travel proportionately further with the same load or can carry proportionately greater loads than when fueled with conventional fuels.

This application is a continuation-in-part of our co-pending application Serial No. 463,629, filed October 20, 1954 now abandoned.

While several embodiments of our invention have been described it should be understood that within the scope of the appended claim this invention may be practiced otherwise than as specifically described.

What we desire to claim and secure by Letters Patent of the United States is:

A method of preparing a high energy fuel which comprises mixing and reacting ethylene and diborane, using a molar ratio of diborane to ethylene that is greater than 2 to 1, at a super atmospheric pressure greater than 150 p.s.i.g. and a temperature within the range of 25° to 200° C., where pressure and temperature are correlated to result in pyrolysis, and recovering the resulting liquid product formed.

References Cited in the file of this patent

Hurd: J. Amer. Chem. Soc. 70, pp. 2053–2055 (1948).
Hurd: Chemistry of the Hydrides, John Wiley & Sons (New York), 1952 (pp. 86–88 relied on).